US011763957B2

(12) United States Patent
Izumi et al.

(10) Patent No.: US 11,763,957 B2
(45) Date of Patent: Sep. 19, 2023

(54) DISPERSIVE ELEMENT

(71) Applicant: SHIMADZU CORPORATION, Kyoto (JP)

(72) Inventors: Takuro Izumi, Kyoto (JP); Satoshi Tokuda, Kyoto (JP); Susumu Adachi, Kyoto (JP); Tetsuya Yoneda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 75 days.

(21) Appl. No.: 17/610,640

(22) PCT Filed: Jul. 18, 2019

(86) PCT No.: PCT/JP2019/028235
§ 371 (c)(1),
(2) Date: Nov. 11, 2021

(87) PCT Pub. No.: WO2021/009897
PCT Pub. Date: Jan. 21, 2021

(65) Prior Publication Data
US 2022/0208408 A1 Jun. 30, 2022

(51) Int. Cl.
*G01K 1/06* (2006.01)
*G21K 1/06* (2006.01)

(52) U.S. Cl.
CPC .................................... *G21K 1/06* (2013.01)

(58) Field of Classification Search
None
See application file for complete search history.

(56) References Cited

U.S. PATENT DOCUMENTS 7,448,763 B2 * 11/2008 Frommeyer ........... G02B 7/181 359/848
9,579,061 B2 2/2017 Udagawa et al.
2013/0146771 A1 * 6/2013 Cook ...................... G01J 5/061 250/339.07
2014/0291518 A1 * 10/2014 Soejima ............... G01N 23/223 378/71
2021/0184201 A1 * 6/2021 Choi ................. H01M 10/0562

FOREIGN PATENT DOCUMENTS

EP 732421 A1 9/1996
JP 8-260150 A 10/1996
JP 2011-117891 A 6/2011

OTHER PUBLICATIONS

Written Opinion by the International Search Authority for corresponding PCT application No. PCT/JP2019/028235, dated Oct. 8, 2019, submitted with a partial translation.
Office Action dated Jul. 26, 2022 for corresponding Japanese patent application No. JP 2021-532638.

* cited by examiner

*Primary Examiner* — Hoon K Song
(74) *Attorney, Agent, or Firm* — Muir Patent Law, PLLC

(57) ABSTRACT

A dispersive element is provided with a dispersive crystal for spectrally dispersing X-rays, a first support layer supporting the dispersive crystal, and a second support layer supporting the first support layer. The first support layer is greater in a thermal expansion coefficient than the dispersive crystal. The second support layer is smaller in a thermal expansion coefficient than the first support layer and is greater in rigidity than the first support layer.

2 Claims, 5 Drawing Sheets

DISPERSIVE ELEMENT

TECHNICAL FIELD

The present invention relates to a dispersive element.

BACKGROUND OF THE INVENTION

Conventionally, a dispersive element used in a fluorescent X-ray analyzer or the like is known. For example, Japanese Unexamined Patent Application Publication No. 2011-117891 (hereinafter referred to as "Patent Document 1") discloses a dispersive element including a dispersive crystal and a heat transfer member. The dispersive crystal is made of a silicon single crystal or a germanium single crystal. The heat transfer member is made of an inorganic material containing at least one of a carbon nanofiber and a carbon nanotube. The thermal conductivity of the heat transfer member is greater than the thermal conductivity of the dispersive crystal. For this reason, the heat generated in the X-ray irradiation target region of the dispersive crystal is transferred to the heat transfer member, and therefore the temperature distribution of the dispersive crystal is equalized.

PRIOR ART DOCUMENT

Patent Document

Patent Document 1: Japanese Unexamined Patent Application Publication No. 2011-117891

SUMMARY OF THE INVENTION

Problems to be Solved by the Invention

In a dispersive element as described in Patent Document 1, a distortion occurs in the dispersive crystal due to the difference between the thermal expansion coefficient of the dispersive crystal and the thermal expansion coefficient of the heat transfer member, which sometimes reduces the spectral performance. For example, in a case where the thermal expansion coefficient of the heat transfer member is greater than the thermal expansion coefficient of the dispersive crystal, the heat transfer member is curved so as to be convex on a side opposite to the dispersive crystal, causing a distortion in the dispersive crystal.

An object of the present invention is to provide a dispersive element capable of reducing a distortion caused in a dispersive crystal.

Means for Solving the Problem

A first aspect of the present invention relates to a dispersive element comprising:

a dispersive crystal configured to spectrally dispersing X-rays;

a first support layer supporting the dispersive crystal; and a second support layer supporting the first support layer, wherein the first support layer is greater in a thermal expansion coefficient than the dispersive crystal, and wherein the second support layer is smaller in a thermal expansion coefficient than the first support layer and greater in rigidity than the first support layer.

Effects of the Invention

The dispersive element is provided with a second support layer having a thermal expansion coefficient smaller than the thermal expansion coefficient of the first support layer and having rigidity greater than the rigidity of the first support layer. Therefore, it is suppressed that the first support layer is curved so as to be convex to the second support layer due to the difference between the thermal expansion coefficient of the dispersive crystal and the thermal expansion coefficient of the first support layer. Therefore, the distortion to be caused in the dispersive crystal is reduced.

EMBODIMENTS FOR CARRYING OUT THE INVENTION

Figure 1:
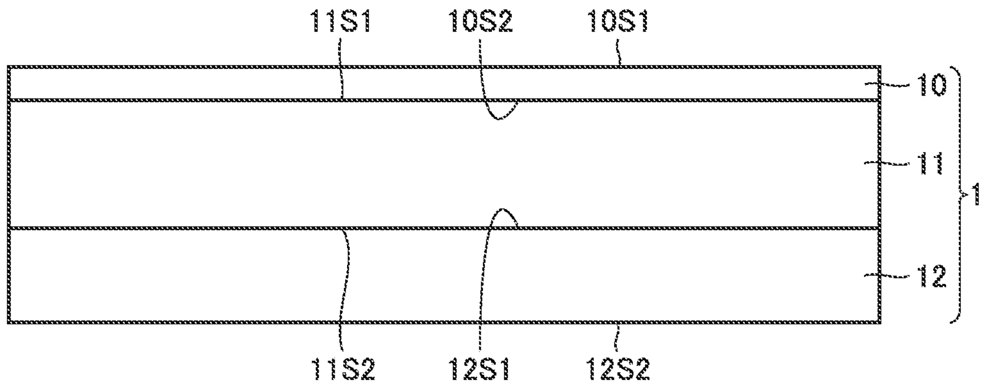
FIG. 1 is a front view schematically showing the configuration of a dispersive element according to one embodiment of the present invention.

Some embodiments of the present invention will be described with reference to the attached drawings. Note that in the drawings referred to below, the same or corresponding member is denoted by the same reference symbol.

FIG. 1 is a perspective view schematically showing the configuration of a dispersive element according to one embodiment of the present invention. As shown in FIG. 1, the dispersive element 1 includes a dispersive crystal 10, a first support layer 11, and a second support layer 12.

The dispersive crystal 10 spectrally disperses X-rays. The dispersive crystal 10 is made of, for example, a single crystal of germanium, a single crystal of lithium fluoride, or a single crystal of silicon. The dispersive crystal 10 has an irradiation target surface 10S1 which is irradiated with X-rays and an opposite surface 10S2 formed on the other side of the irradiation target surface 10S1.

The first support layer 11 supports the dispersive crystal 10. The first support layer 11 is formed in a flat plate shape. The first support layer 11 has a first support surface 11S1 in contact with the opposite surface 10S2 of the dispersive crystal 10, and a first back surface 11S2 formed on the opposite side of the first support surface 11S1. The first support surface 11S1 is glued to the opposite surface 10S2 of the dispersive crystal 10 by an adhesive agent.

The first support layer 11 is preferably made of a light element (for example, an element lighter than titanium) in order to suppress the generation of high-energy impurity rays (X-rays different from X-rays dispersed by the dispersive crystal 10) from the first support surface 11S1 when the dispersive crystal 10 is irradiated with X-rays. The first support layer 11 has a thermal expansion coefficient greater than the thermal expansion coefficient of the dispersive crystal 10. In this embodiment, the first support layer 11 is made of aluminum. The thickness of the first support layer 11 is preferably set to 0.1 mm or more and 100 mm or less, more preferably 1 mm or more and 7 mm or less.

The second support layer 12 supports the first support layer 11. The second support layer 12 is formed in a flat plate shape. The second support layer 12 has a second support surface 12S1 in contact with the first back surface 11S2 of the first support layer 11 and a second back surface 12S2 formed on a side opposite to the second support surface 12S1.

The second support layer 12 has a thermal expansion coefficient smaller than the thermal expansion coefficient of the first support layer 11 and rigidity greater than the rigidity of the first support layer 11. In this embodiment, the second support layer 12 is made of stainless steel (SUS). The thickness of the second support layer 12 may be smaller than the thickness of the first support layer 11. The thickness of the second support layer 12 is preferably set to 0.1 mm or more and 100 mm or less, more preferably 1 mm or more and 5 mm or less.

The dispersive element 1 described above is preferably used for an X-ray analyzer, for example, a wavelength dispersive X-ray fluorescent analyzer (WDX) as disclosed in Japanese Unexamined Patent Application Publication No. 2017-223638.

Next, referring to FIGS. 2 to 5, the simulation results of Examples of the dispersive element 1 according to the above-described embodiment and Comparative Example thereof will be described.

Figure 2:
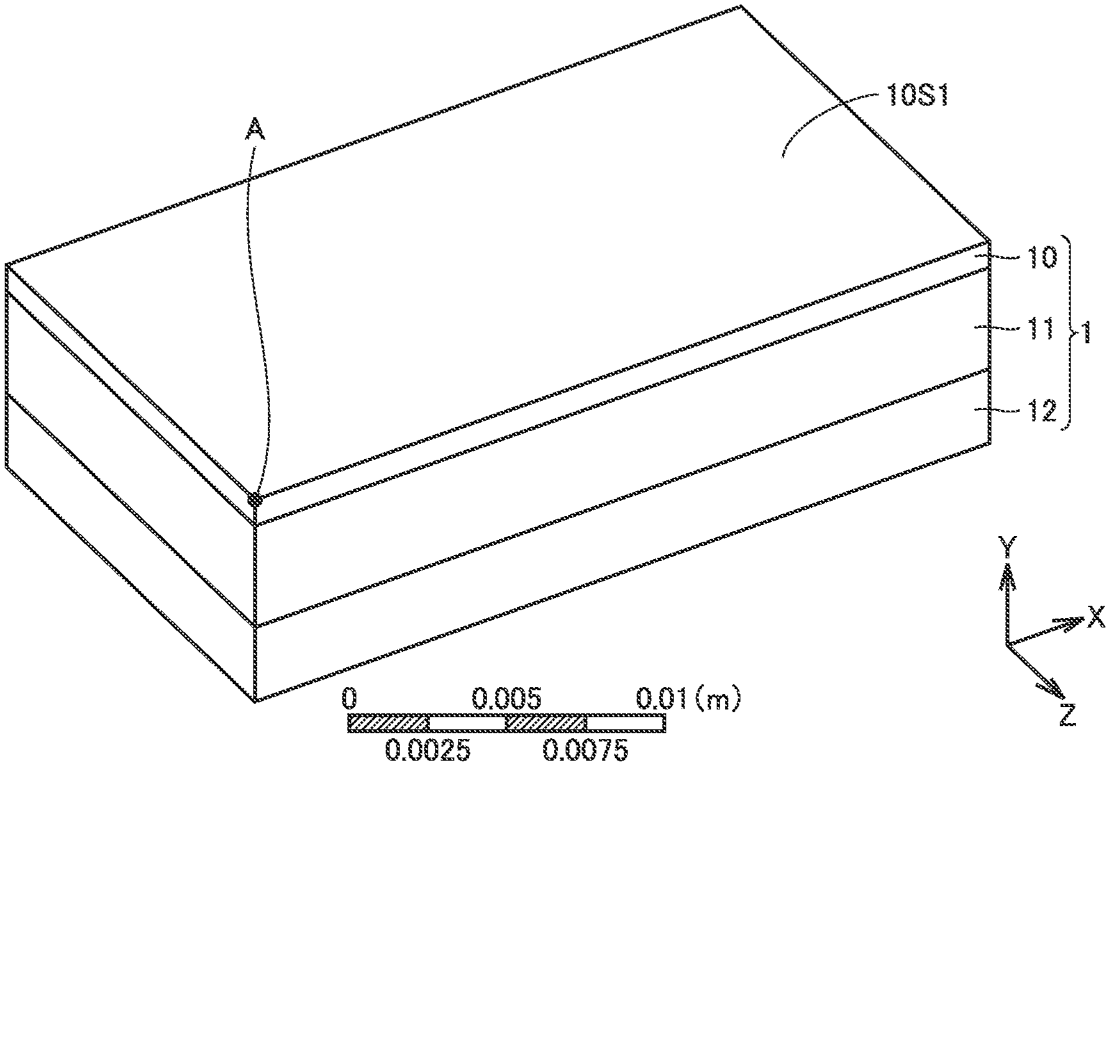
FIG. 2 is a perspective view showing a ¼ target model of the dispersive element shown in FIG. 1.

FIG. 2 shows a ¼ target model of the dispersive element 1. The point A shown in FIG. 2 denotes a center of the irradiation target surface 10S1 of the dispersive crystal 10.

Figure 3:
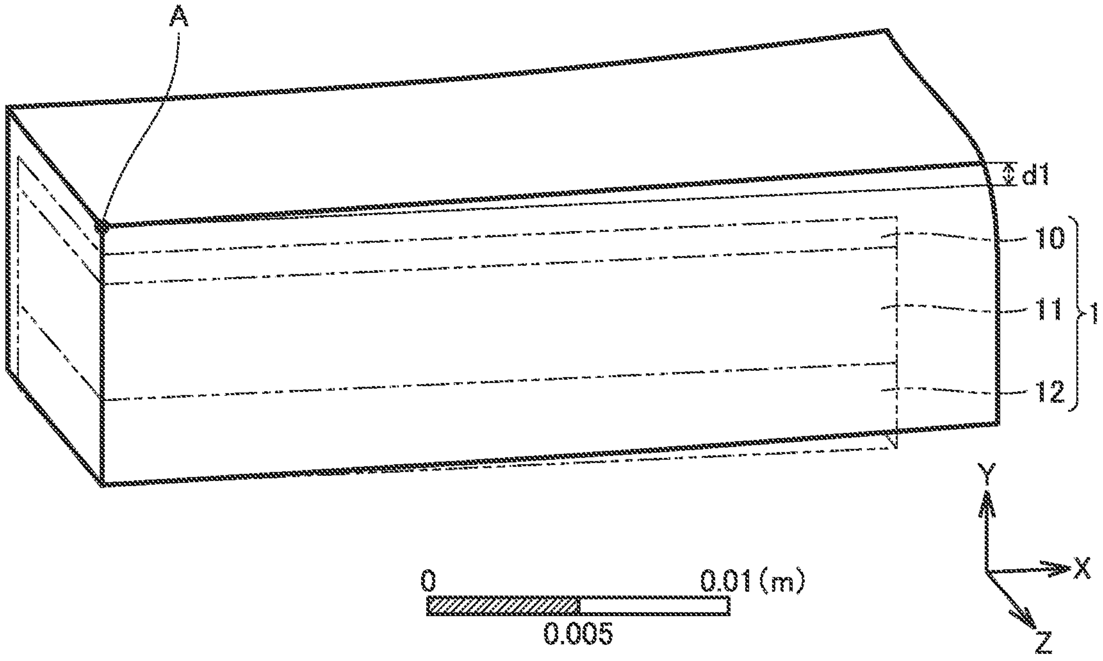
FIG. 3 is a perspective view showing a state after the deformation of the dispersive element of Example 1.

In Example 1 shown in FIG. 3, the dispersive crystal 10 is made of germanium and has a thickness of 1 mm. The first support layer 11 is made of aluminum, and its thickness is 4 mm. The second support layer 12 is made of stainless steel (SUS304) and has a thickness of 3 mm.

Figure 4:
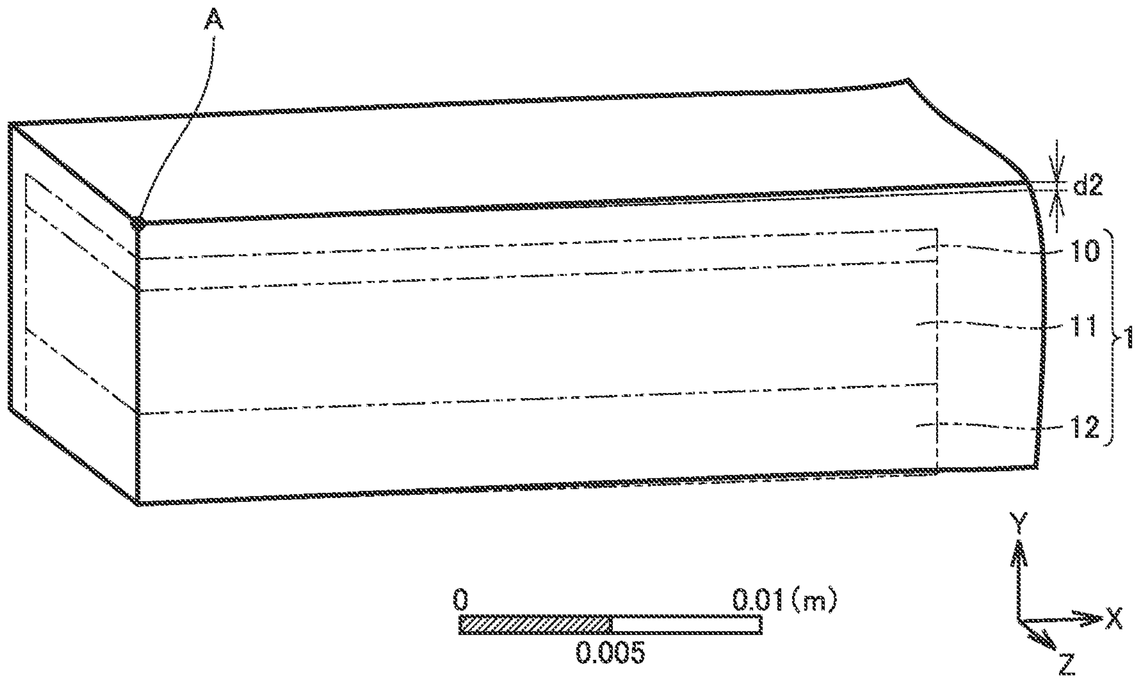
FIG. 4 is a perspective view showing a state after the deformation of the dispersive element of Example 2.

In Example 2 shown in FIG. 4, the dispersive crystal 10 and the first support layer 11 are the same as Example 1. The second support layer 12 is made of stainless steel (SUS316) and has a thickness of 3 mm.

Figure 5:
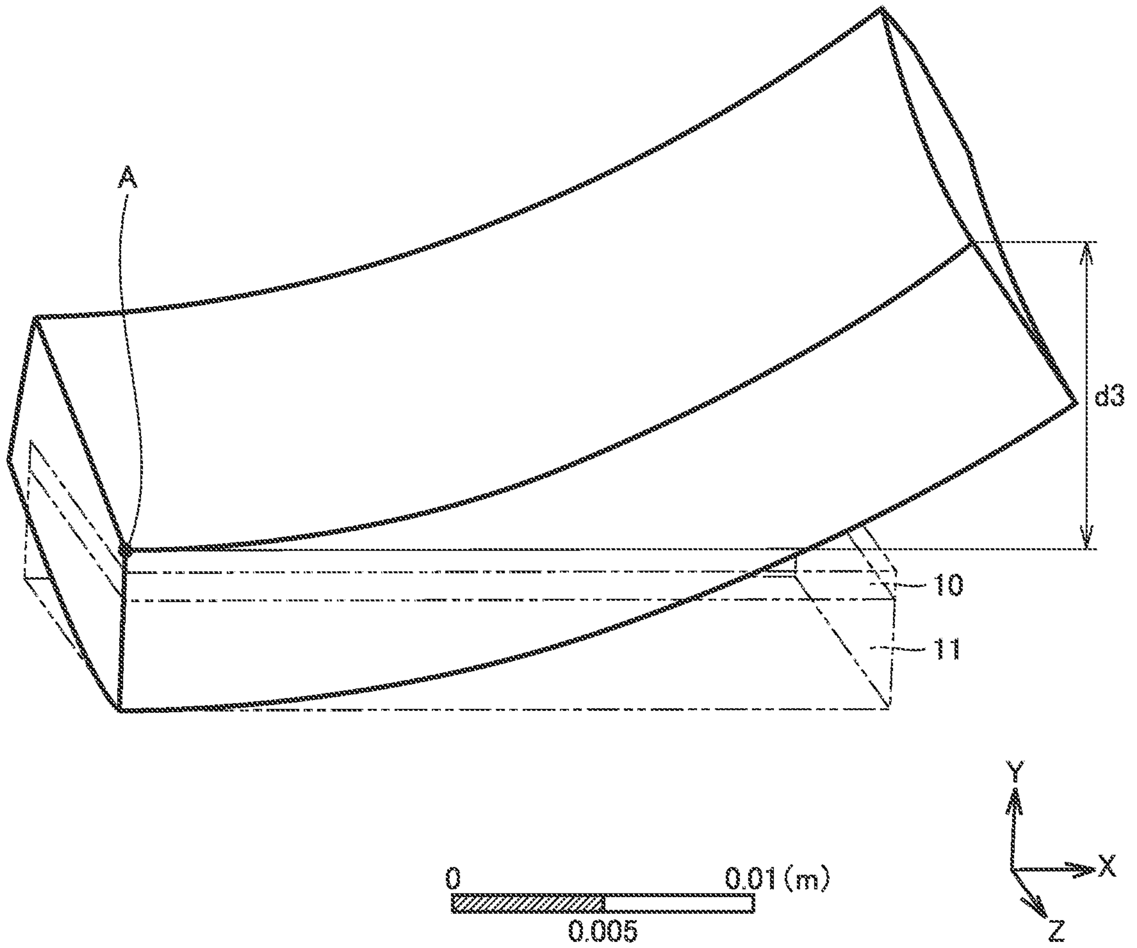
FIG. 5 is a perspective view showing a state after the deformation of a model of Comparative Example.

In Comparative Example shown in FIG. 5, the dispersive crystal 10 and the first support layer 11 are the same as Example 1, but Comparative Example is not provided with a second support layer 12.

Simulations were performed in which a temperature rise of 1.5° C. was given to Examples 1 and 2 and Comparative Example. In FIGS. 3 to 5, the external shape of the model when a temperature rise of 1.5° C. was given is shown by a solid line, and the external shape of the model in a state before the temperature rise was given is shown by a two-dot chain line.

As shown in FIG. 3, in Example 1, the warp d1 of the dispersive crystal 10 was 0.1 μm. As shown in FIG. 4, in Example 2, the warp d2 of the dispersive crystal 10 was 0.02 μm. As shown in FIG. 5, in Comparative Example, the warp d3 of the dispersive crystal 10 was 1.2 μm. Note that the "warp" means the distance between the outer end portion and the center A of the irradiation target surface 10S1 of each model in the X-axis direction and the distance in a direction parallel to the Y-axis.

As described above, the dispersive element 1 of this embodiment has a thermal expansion coefficient smaller than the thermal expansion coefficient of the first support layer 11, and a second support layer 12 having rigidity greater than the rigidity of the first support layer 11. Therefore, it is suppressed that the first support layer 11 is curved so as to be convex to the second support layer 12 side due to the difference between the thermal expansion coefficient of the dispersive crystal 10 and the thermal expansion coefficient of the first support layer 11. Therefore, the distortion occurring in the dispersive crystal 10 can be reduced.

It should be understood that the embodiments disclosed here are examples in all respects and are not restrictive. The scope of the present invention is indicated by claims rather than by the above-described descriptions of the embodiments and includes all modifications within the meanings and scopes equivalent to claims.

[Aspects]

It will be understood by those skilled in the art that the plurality of exemplary embodiments described above is illustrative of the following aspects.

(Item 1)

A dispersive element according to a first aspect of the present invention, includes:

a dispersive crystal configured to spectrally dispersing X-rays;

a first support layer supporting the dispersive crystal; and a second support layer supporting the first support layer, wherein the first support layer is greater in a thermal expansion coefficient than the dispersive crystal, and wherein the second support layer is smaller in a thermal expansion coefficient than the first support layer and greater in rigidity than the first support layer.

The dispersive element described in the first item has a thermal expansion coefficient smaller than the thermal expansion coefficient of the first support layer and a second support layer having a rigidity greater than the rigidity of the first support layer. Therefore, it is suppressed that the first support layer is curved so as to be convex to the second support layer side due to differences between the thermal expansion coefficient of the dispersive crystal and the thermal expansion coefficient of the first support layer. Therefore, the distortion caused in the dispersive crystal is reduced.

(Item 2)

In the dispersive element as recited in the above-described Item 1, a thickness of the first support layer is preferably 1 mm or more.

According to the dispersive element described in the above-described Item 2, even if impurity rays (X-rays different from X-rays spectrally dispersed by the dispersive crystal) are generated from the surface of the second support layer when the dispersive crystal is irradiated with X-rays, at least a part of the impurity rays is absorbed by the first support layer. Therefore, the analytical accuracy of X-rays dispersed by the dispersive element can be enhanced.

(Item 3)

In the dispersive element as recited in the above-described Item 1 or 2, it is preferable that the dispersive crystal be made of germanium or lithium fluoride, the first support layer be made of aluminum, and the second support layer be made of stainless steel.

According to the dispersive element described in the third item, since the first support layer is made of aluminum, the first support layer can be produced relatively inexpensively. In addition, the processability of the first support layer is high, and the generation of impurity rays from the first support layer can be reduced.

DESCRIPTION OF SYMBOLS

1: Dispersive element
2: Holder
3: Excitation source
4: Slit
5: X-ray linear sensor
10: Dispersive crystal
10S1: Irradiation target surface

10S2: Opposite surface
11: First support layer
11S1: First support surface
11S2: First back surface
12: Second support layer
12S1: Second support surface
12S2: Second back surface
100: X-ray spectroscopic analyzer
S: Sample

The invention claimed is:

1. A dispersive element comprising:

a dispersive crystal configured to spectrally dispersing X-rays;

a first support layer supporting the dispersive crystal; and a second support layer supporting the support layer, wherein the first support layer is greater in a thermal expansion coefficient than the dispersive crystal, wherein the second support layer is smaller in a thermal expansion coefficient than the first support layer and greater in rigidity than the first support layer, wherein the dispersive crystal is made of germanium or lithium fluoride, wherein the first support layer is made of aluminum, and wherein the second support layer is made of stainless steel.

2. The dispersive element as recited in claim 1, wherein a thickness of the first support layer is 1 mm or more.

* * * * *